United States Patent
Oshidari

[11] Patent Number: 6,159,126
[45] Date of Patent: Dec. 12, 2000

[54] TOROIDAL CONTINUOUSLY VARIABLE TRANSMISSION

[75] Inventor: Toshikazu Oshidari, Yokosuka, Japan

[73] Assignee: Nissan Motor Co., Ltd., Yokohama, Japan

[21] Appl. No.: 09/327,483

[22] Filed: Jun. 8, 1999

[30] Foreign Application Priority Data

Jun. 22, 1998 [JP] Japan .................................. 10-174932

[51] Int. Cl.$^7$ .................................................. F16H 15/38
[52] U.S. Cl. ................................................. 476/10; 476/42
[58] Field of Search ................... 476/10, 42, 40

[56] References Cited

U.S. PATENT DOCUMENTS

| | | |
|---|---|---|
| 4,126,052 | 11/1978 | Jackman . |
| 4,434,675 | 3/1984 | Kraus . |
| 4,444,068 | 4/1984 | Kraus ........................................ 476/10 |
| 4,858,484 | 8/1989 | Kraus ........................................ 476/10 |
| 5,330,396 | 7/1994 | Lohr et al. ................................ 476/10 |
| 5,564,993 | 10/1996 | Robinson ................................ 476/10 |
| 6,045,481 | 4/2000 | Kumagai .............................. 476/42 X |

FOREIGN PATENT DOCUMENTS 28 47 919  11/1978  Germany .
63-92859   6/1988  Japan .

OTHER PUBLICATIONS

Patent Abstracts of Japan, vol. 011, No. 234 (1987) & JP 62 046060 A (NIPPON SEIKO KK).
Patent Abstracts of Japan, vol. 011, No. 221 (1987) & JP 62 037562 A (NIPPON SEIKO KK).
Soviet Inventors Illustrated Section PQ, Week 8711, Mar. 25, 1987 Derwent Publication Ltd., London, GB; Class Q64, AN 87–078306 XP002116873 & SU 1 245 785 A (Svetozakov YU V), Jul. 23, 1987.

*Primary Examiner*—Rodney H Bonck
*Attorney, Agent, or Firm*—Foley & Lardner

[57] ABSTRACT

When a vehicle comprising a toroidal continuously variable transmission is pulled or run under its own inertia when the engine has stopped, the rotation torque of the drive wheels varies a gyration angle of a power roller (44FR, 44FL, 44RR, 44RL) via an output disk (18, 20) in a direction so as to reduce a speed ratio. This decrease of speed ratio reduces starting performance when the vehicle is restarted by the engine. This invention suppresses the variation of gyration angle by a spring (100) which limits the displacement of a trunnion (46FR, 46FL, 46RR, 46RL) supporting the power roller (44FR, 44FL, 44RR, 44RL).

8 Claims, 4 Drawing Sheets

TOROIDAL CONTINUOUSLY VARIABLE TRANSMISSION

FIELD OF THE INVENTION

This invention relates to a toroidal continuously variable transmission for a vehicle.

BACKGROUND OF THE INVENTION

Jikkai Sho 63-92859 published by the Japanese Patent Office in 1988 discloses a toroidal continuously variable transmission for a vehicle.

This toroidal continuously variable transmission comprises power rollers which transmit a rotation in contact with an input disk and an output disk, and the rotation speed ratio of the input disk and output disk is varied by varying the contact points between the power rollers and the disks. The contact points between a power roller and the disks are varied by varying a gyration angle of the power roller by displacing a trunnion which supports the power roller. The trunnion is displaced according to an oil pressure supplied via a pressure control valve.

The input disk is connected to an output shaft of an engine via a forward/reverse change-over mechanism and torque converter. The output disk is joined to drive wheels via an output gear unit and a differential gear unit.

SUMMARY OF THE INVENTION

If a vehicle is pulled when an engine has stopped, a rotational torque is input to an output disk from drive wheels, and this rotates an input disk and the engine via power rollers.

In this case, the input direction of rotational torque to the transmission is the reverse of that during normal running. The rotation resistance of the input disk then varies a gyration angle of the power roller in the decreasing direction of speed ratio. The speed ratio mentioned here is equivalent to a value obtained by dividing the rotational speed of the input disk by the rotation speed of the output disk. Therefore, as the rotation speed of the drive wheels relative to engine rotation speed increases the lower the speed ratio.

On the other hand, during normal start of the vehicle, the speed ratio is maintained at a maximum value. Due to this, to start the engine when the vehicle has stopped at a small speed ratio after being pulled, the speed ratio must be increased to the maximum value from a small value, and this operation interferes with the smooth departure of the vehicle. This is the same when the vehicle is pulled backwards.

It is therefore an object of this invention to limit a variation of speed ratio in a decreasing direction when a rotational torque is input into a continuously variable transmission from the output disk.

It is another object of this invention to eliminate the effect of other factors causing decrease of speed ratio which is unintended by a driver.

In order to achieve the above objects, this invention provides a toroidal continuously variable transmission, comprising an input disk having a rotation axis, an output disk having the same rotation axis as the input disk, a power roller in contact with the input disk and output disk for transmitting a rotational torque between the disks, a trunnion for supporting the power roller, this trunnion having a trunnion axis perpendicular to the rotation axis, an oil pressure drive device for varying a contact point between the power roller and the input disk and output disk by displacing the trunnion within a predetermined range along the trunnion axis, and a limiting member for limiting the displacement of the trunnion when a load acts on the trunnion in the direction of the trunnion axis, to a range smaller than the predetermined range when a rotation torque is input from the output disk to the power roller.

The details as well as other features and advantages of this invention are set forth in the remainder of the specification and are shown in the accompanying drawings.

DESCRIPTION OF THE PREFERRED EMBODIMENTS

Figure 1:
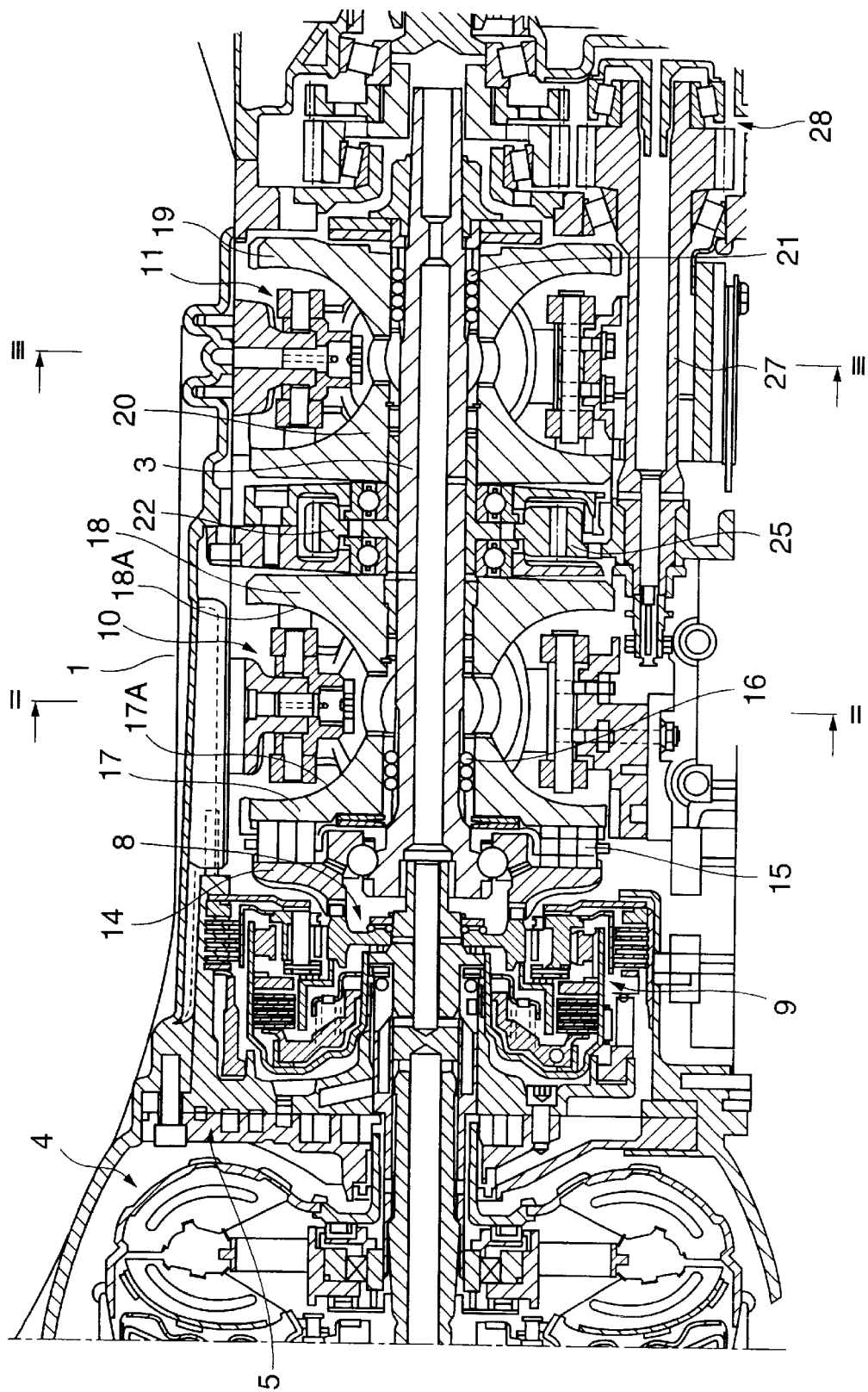
FIG. 1 is a longitudinal sectional view of a vehicle drive unit comprising a toroidal continuously variable transmission according to this invention.

Referring to FIG. 1 of the drawings, a vehicle toroidal continuously variable transmission comprises first and second toroidal units 10, 11 disposed in series in a transmission case 1.

The rotation of an engine is transmitted to a cam flange 14 via a torque converter 4, oil pump 5 and forward/reverse change-over mechanism 9.

The rotation of the cam flange 14 is transmitted to an input disk 17 of the first toroidal unit 10 via a cam rollers 15.

The input disk 17 is joined to an input disk 19 of the second toroidal unit 11 via a rotation shaft 3. These input disks 17, 19 are joined to the rotation shaft 3 via ball splines 16, 21. Rotation relative to the shaft 3 is restricted, and axial displacement is permitted within a predetermined range.

The cam rollers 15 exert a thrust load according to the rotation of the cam flange 14, on the input disks 17, 19, and the input disks 17, 19 are pushed towards output disks 18, 20 facing the input disks 17, 19. The output disks 18, 20 are engaged free to rotate on the outer circumference of the rotation shaft 3.

The input disk 17 and output disk 18 forming the first toroidal unit 10 have corresponding toroidal-shaped wall surfaces 17A, 18A, and a pair of power rollers 44FR, 44FL are gripped by the wall surfaces 17A, 18A due to the aforesaid thrust load. Identical power rollers 44RR, 44RL are gripped between the input disk 19 and output disk 20 of the second toroidal unit 11, as shown in FIG. 3.

Figure 2:
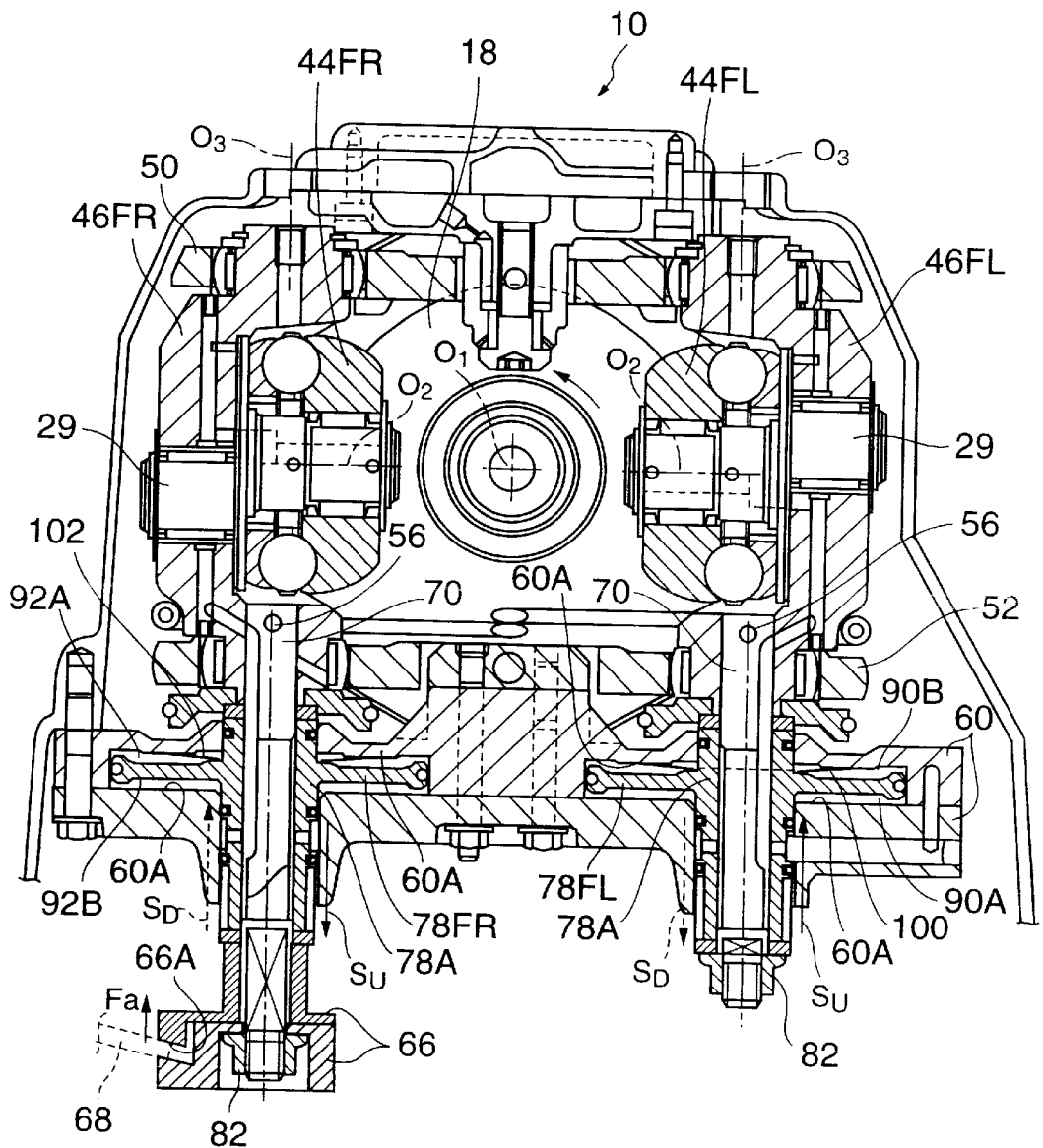
FIG. 2 is a cross-sectional view of a first toroidal unit according to this invention taken along a line II—II of FIG. 1.
Figure 3:
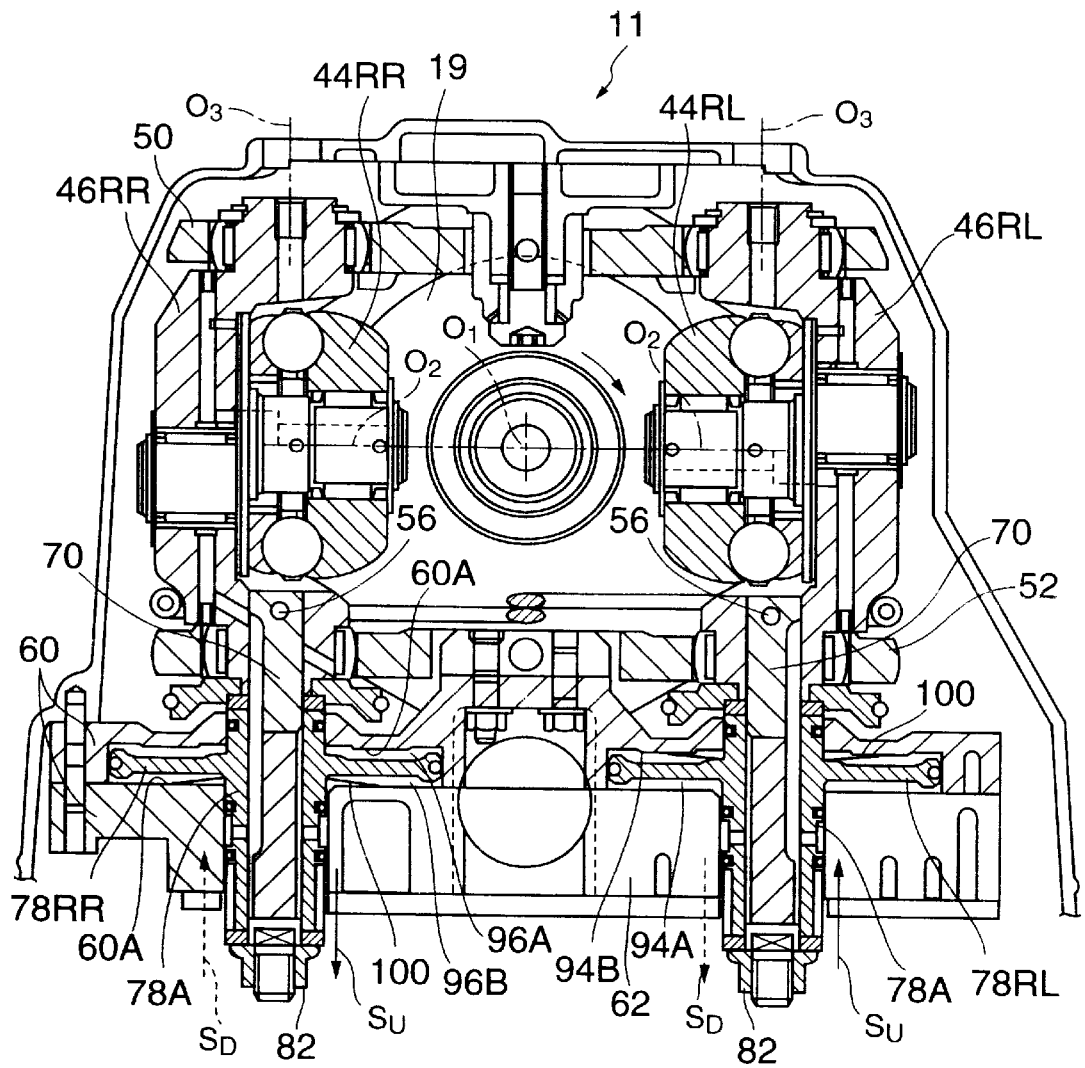
FIG. 3 is a cross-sectional view of a second toroidal unit according to this invention taken along a line III—III of FIG. 1.

The reason why the symbol L is given to the right power roller and the symbol R is given to the left power roller in FIGS. 2 and 3 is that the symbols R are given to the parts situated on the right hand and the symbols L are given to the parts situated on the left hand when they are viewed from the right hand of FIG. 1. FIGS. 2 and 3 are both cross-sectional views viewed from the left hand of FIG. 1, so the symbols R are given to the left parts and the symbols L are given to the right parts.

The rotation of the input disks 17, 19 is transmitted to the output disks 18, 20 via these power rollers 44FR, 44FL, 44RR and 44RL.

The rotation of the output disks 18, 20 is transmitted to an output shaft and drive wheels, not shown, via an output gear 22, gear 25, counter shaft 27 and gear 28.

The contact point of the input disk 17 and output disk 18 of the power roller 44FR (44FL) varies according to the gyration angle of the power roller 44FR (44FL) i.e., the rotation angle of the power roller 44FR (44FL) about an axis $O_3$ in FIG. 2, and the ratio of rotation speeds of the input disk 17 and output disk 18 is determined according to the distance between the contact point and an axis $O_1$. This speed ratio is the speed ratio of this toroidal transmission. The same relation holds in the power rollers 44RR (44RL), input disk 19 and output disk 20 of the second toroidal unit 11.

Next, the construction of the parts of the toroidal unit will be described referring to FIGS. 2 and 3.

The first toroidal unit 10 shown in FIG. 2 comprises a pair of trunnions 46FR, 46FL for supporting the power rollers 44FR, 44FL. The power rollers 44FR, 44FL are supported via crank-shaped eccentric shafts 29 by the trunnions 46FR, 46FL. The eccentric shaft 29 comprises a base end supported free to rotate by a trunnion 46 and a tip end which is crank-shaped. The power roller 44FR (44FL) is supported free to rotate around a rotation shaft $O_2$ by this point. The power roller 44FR (44FL) is also permitted to swing within predetermined limits around the base end as fulcrum.

The upper parts of the trunnions 46FR, 46FL are connected by an upper link 50 via spherical joints, and the lower parts of the trunnions 46FR, 46FL are connected by a lower link 52 via spherical joints.

A hole is formed in the lower part of the trunnion 46FR(46FL), and a trunnion shaft 70 is inserted into this hole and 46FR(46FL) joined to the trunnion 46FR (46FL) by a pin 56.

A boss 78A of a servo piston 78FR(78FL) engages with the outer circumference of the trunnion shaft 70, and the servo piston 78FR(78FL) is secured with the trunnion 46FL by tightening a nut 82 which screws onto a male screw formed on the lower end of the trunnion shaft 70.

The servo piston 78FR is housed in a piston housing 60. In the piston housing 60, a first oil chamber 92A is formed above the servo piston 78FR, and a second oil chamber 92B is formed below it. The servo piston 78FL is also housed in the same piston housing 60, but unlike the case of the servo piston 78FR, a first oil chamber 90A is formed below and a second oil chamber 90B is formed above the servo piston 78FL.

Equal oil pressures are supplied to the first oil chambers 90A, 92A via an oil pressure control valve, not shown. Equal oil pressures are also supplied to the second oil chambers 90B, 92B, from the same oil pressure control valve. The servo pistons 78FL, 78FR are displaced along the axis $O_3$ according to the differential pressure of the first oil chambers 90A, 92A and the second oil chambers 90B, 92B. The servo pistons 78FL, 78FR therefore displace in opposite directions to each other.

Due to this displacement, each of the trunnions 46FR, 46FL suffers a rotational displacement around the axis $O_3$ together with the power roller 44FR (44FL). The rotational displacements of the power rollers 44FR and 44FL take place in reverse directions.

According to the change in the distance of the contacts from the axis $O_1$, the contact points of the input disk 17 and the output disk 19 with the power rollers 44FR, 44FL, change, and the ratio of speeds of the input disk 17 and output disk 19 changes.

In the trunnion 46FR, a precess cam 66 is further gripped by the boss 78A and the nut 82.

The precess cam 66 comprises a slanting guide groove 66A on its outer circumference, and one end of a link 68 is inserted in the guide groove 66A. Consequently, the displacement of the trunnion 46FR in the direction of the axis $O_3$, and the rotational displacement, i.e., the gyration angle, of the power roller 44FR around the axis $O_3$, are fed back to an oil pressure control valve via the displacement of the link 68. The link 68 is pushed in the direction of the arrow Fa in the figure by a spring, not shown, so that an upper surface of the end of the link 68 and a guide surface of the guide groove 66A are always in contact.

In the normal running state of the vehicle when an engine of the vehicle is driving the drive wheels via the continuously variable transmission, if the pressures of the first oil chambers 90A, 92A are raised and the pressures of the second oil chambers 90B, 92B are reduced, the servo pistons 78FR, 78FL displace in the shift-up direction shown by the solid arrow $S_U$ in the Figure along the axis $O_3$ due to the pressure differential.

As a result, the gyration angles of the power rollers 44FR, 44FL change, and the speed ratio varies in the decreasing direction, i.e., towards higher speed.

Conversely, if the pressures of the first oil chambers 90A, 92A are reduced and the pressures of the second oil chambers 90B, 92B are increased, the servo pistons 78FR, 78FL displace in the shift-down direction shown by the broken arrow $S_D$ in the figure. As a result, the gyration angles of the power rollers 44FR, 44FL change, and the speed ratio varies in the increasing direction, i.e., towards lower speed.

The construction of the second toroidal unit 11 shown in FIG. 3 is almost the same as that of the first toroidal unit 10. However, in the second toroidal unit 11, there is no feedback mechanism comprising a precess cam and link.

An oil pressure equal to that supplied to the oil chambers 90A, 92A of the first toroidal unit 10, is supplied to the oil chambers 94A, 96A of the second toroidal unit 11, and an oil pressure equal to that supplied to the oil chambers 90B, 92B of the first toroidal unit 10 is also supplied to the oil chambers 94B, 96B. Due to this, the first toroidal unit 10 and second toroidal unit 11 transmit the rotation of the input disks 17, 19 to the output disks 18, 20 at the same speed ratio.

In this continuously variable transmission, first plate springs 100 are respectively arranged in the second oil chamber 90B of the first toroidal unit 10 and the second oil chambers 94B and 96B of the second toroidal unit.

A second plate spring 102 is arranged in the first oil chamber 92A of the first toroidal unit 10.

The plate springs 100, 102 are both fitted to the outer circumference of the boss 78A. The inner circumferential diameters of the plate springs 100, 102 are set so as to leave a small clearance between the inner circumference of the plate springs 100, 102 and the boss 78A. The inner circumference of the plate springs 100, 102 comes in contact with the servo pistons 78FL, 78RR and 78RL. The rims of the plate springs 100, 102 come in contact with the wall surface 60A of the piston housing 60 which forms the second oil chambers 90B, 94B and 96B. Since a part of large diameter comes in contact with the wall surface 60A of the case 60, the unit pressure exerted by the plate springs 100, 102 on the wall surface 60A can be reduced, and antiwear resistance of parts is improved. Further, the provision of a slight clearance between the inner circumference of the plate springs 100, 102 and the boss 78A has a desirable effect in that it makes the direction of the elastic restoring force of the plate springs 100, 102 which acts on the servo pistons 78FR, 78FL, 78RR, 78RL, coincide with the direction of the axis $O_3$.

The first plate spring 100 pushes the servo pistons 78FL, 78RR and 78RL in the downshift direction. Let the sum total of these forces be $Fs_1$. The second plate spring 102 pushes the servo piston 78FR in the upshift direction. Let this force be $Fs_2$.

If the vehicle is pulled forwards when the engine has stopped, a rotational torque is input from the drive wheels to the output disks 18, 20 of the continuously variable transmission, and this rotates the input disks 17, 19 via the power roller 44FR, 44FL, 44RR and 44RL. At this time, the rotation resistance of the input disks 17, 19 exerts a force in the upshift direction on the power roller 44FR, 44FL, 44RR and 44RL.

Herein, let the force exerted in the upshift direction by the input disks 17, 19 on the power rollers 44FR, 44FL, 44RR and 44RL be $F_1$. The relation between this force $F_1$ and the force $Fs_1$ in the downshift direction exerted by the plate spring 100 on the servo pistons 78FL, 78RR and 78RL is set as follows. However, as the force $Fs_1$ depends on the deformation amount of the plate spring 100, for example, the spring load of the plate spring 100 is set so that, for example, the following relation exists relative to a displacement amount of the servo pistons 78FL, 78RR and 78RL which is equivalent to a speed ratio equal to at least X:1.

$$Fs_1 > F_1$$

Also, let the force in the downshift direction with which the spring pushing the link 68 exerts on the servo piston 78FR be Fa. The spring load of the plate spring 102 is set so that the following relation holds between this force Fa, the force $F_1$ in the upshift direction acting on the power roller 44Fr, and the force $Fs_2$ which the second plate spring 102 exerts on the servo piston 78FR.

$$Fa \approx F_1 + Fs_2$$

wherein≈means "approximately equal to."

By setting the characteristics of the first plate spring 100 in this way, when the vehicle is pulled forward, the speed ratio of the continuously variable transmission does not become less than the set value X:1, and impairment of startup performance when the vehicle is restarted, is therefore prevented.

By balancing the force $F_1$ in the upshift direction acting on the power roller 44FR and the elastic restoring force $Fs_2$ of the second plate spring 102, the load conditions of the power roller 44FR become identical to those of the other power rollers 44FL, 44RR and 44RL. Accordingly, the operation of the power roller 44FR may be synchronized with those of the other power rollers 44FL, 44RR and 44RL.

The first and second plate springs 100, 102 are housed inside the piston housing 60, so they do not take up extra space.

Figure 4:
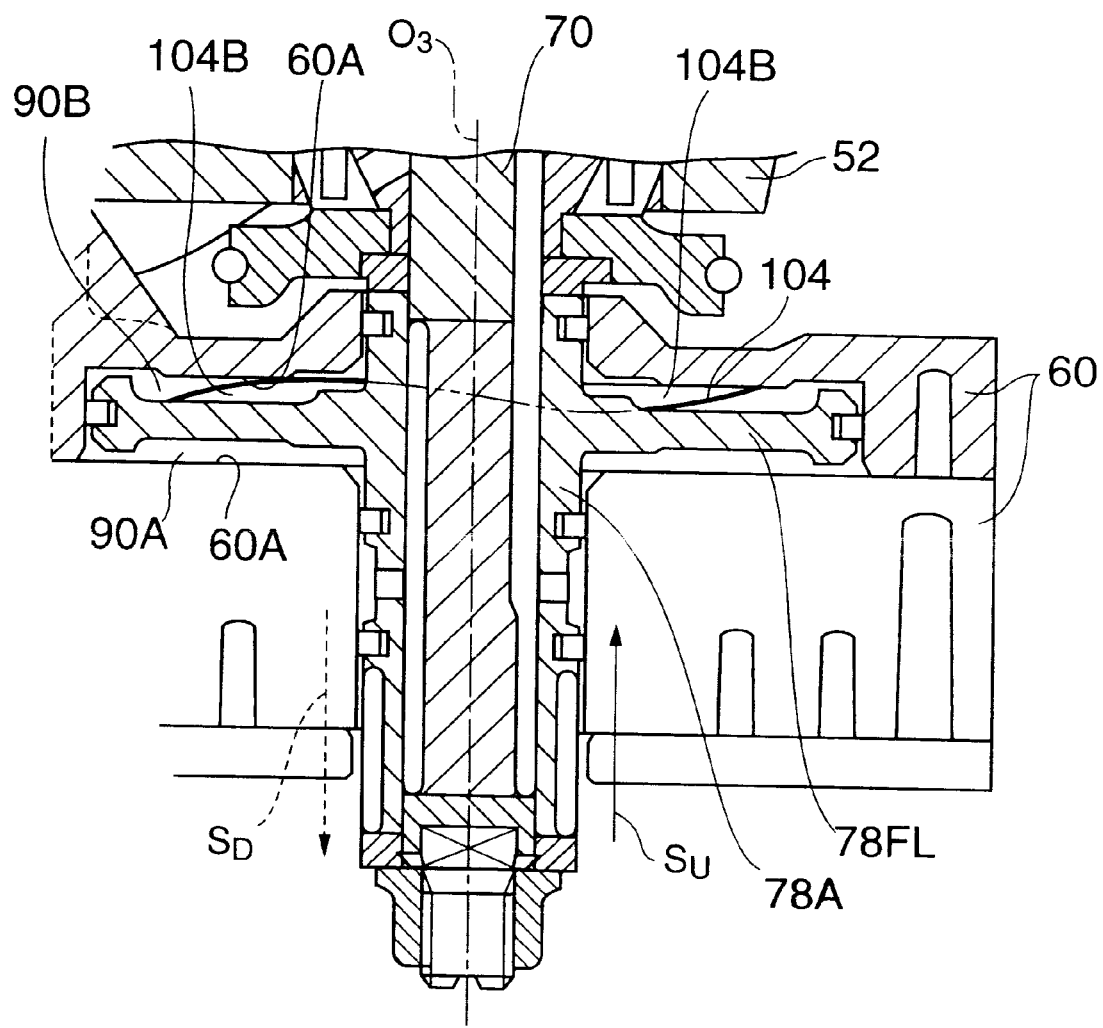
FIG. 4 is a longitudinal sectional view of a trunnion according to another embodiment of this invention.

Next, another embodiment of this invention will be described referring to FIG. 4.

According to this embodiment, a wave spring 104 is used instead of the first plate spring 100.

The wave spring 104 is a ring-shaped spring which has a wave-shaped cross-section in a circumferential direction. The upward crest of the wave spring 104 comes in contact with the piston housing 60, and the lower crest comes in contact with the upper surface of the servo piston 78FL in the case of trunnions 46FL and 46RR as shown in FIG. 4. In the trunnion 46RL, the wave spring 104 is disposed in the lower oil chamber 94B, its upper crest comes in contact with the lower surface of the piston 78RL and its lower crest comes in contact with the piston housing 60. As in the case of the first plate spring 100, the wave spring 104 is attached leaving a small clearance with the outer circumference of the boss 78A. Guides 104B are also formed in the wave spring. One of the guides 104B comes in contact with the piston housing 60 while the other of the guides 104B comes in contact with the servo piston 78FL (78RR, 78RL) so as to ensure coaxiality of the wave spring 104 with the boss 78A.

In this embodiment, the same effect is obtained as in the aforesaid first embodiment. Further, the contact area with the case 60 and the upper surfaces of the servo pistons 8FL, 78RR and 78RL is larger than when using the first plate spring 100, so wear of parts is prevented and durability of the transmission is further improved.

Both of the above-mentioned embodiments aim to limit the change of speed ratio when the vehicle is pulled in the forward direction. However, the change of speed ratio when the vehicle is being pulled or running under its own inertia in the reverse direction can also be suppressed by reversing the direction of the elastic restoring force of the first plate spring 100, i.e., by for example disposing the first plate spring 100 of the first oil chamber 90B, in the second oil chamber 90A.

The contents of Tokugan Hei 10-174932, with a filing date of Jun. 22, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A toroidal continuously variable transmission, comprising:
    an input disk having a rotation axis;
    an output disk having the same rotation axis as said input disk;
    a power roller in contact with said input disk and output disk for transmitting a rotational torque between the disks;
    a trunnion for supporting said power roller, said trunnion having a trunnion axis perpendicular to said rotation axis;
    an oil pressure drive device for varying a contact point between said power roller and said input disk and output disk by displacing said trunnion within a predetermined range along the trunnion axis; and
    a limiting member for limiting the displacement of said trunnion in the direction of said trunnion axis, when a rotation torque is input from said output disk to said power roller,
    wherein said limiting member produces an elastic resistance against a direction of the displacement of said trunnion when there is no oil pressure from the oil pressure drive device and the rotation torque is input from said output disk to said power roller.

2. A toroidal continuously variable transmission as defined in claim 1, wherein said oil pressure drive device comprises a piston joined to said trunnion and an oil chamber which exerts a pressure on said piston in the direction of said trunnion axis, and said limiting member is disposed in said oil chamber.

3. A toroidal continuously variable transmission as defined in claim 2, wherein said limiting member comprises a plate spring disposed in said oil chamber for elastically supporting said piston in a direction opposing said load.

4. A toroidal continuously variable transmission as defined in claim 3, wherein said trunnion comprises a trunnion shaft coaxial with said trunnion axis, said piston is fixed to said trunnion shaft, said trunnion shaft passes through said oil chamber, said oil chamber has a wall surface facing said piston, and said plate spring comprises an outer circumferential part which comes in contact with said wall surface and an inner circumferential part which comes in contact with said piston.

5. A toroidal continuously variable transmission as defined in claim 2, wherein said limiting member comprises a ring-shaped wave spring disposed in said first oil chamber for elastically supporting said piston in a direction opposing said load.

6. A toroidal continuously variable transmission as defined in claim 1, wherein said transmission further comprises a resilient member and said trunnion comprises a second trunnion pushed in the direction of said trunnion axis by said resilient member, and said limiting member comprises a supporting member which supports said second trunnion against said resilient member.

7. A toroidal continuously variable transmission as defined in claim 6, wherein said oil pressure drive device comprises a piston connected to said second trunnion and an oil chamber which exerts a pressure on said piston in the direction of said trunnion axis, and said supporting member elastically supports said piston in said oil chamber.

8. A toroidal continuously variable transmission as defined in claim 7, wherein said second trunnion comprises a trunnion shaft coaxial with said trunnion axis, and said resilient member comprises a member which follows the movement of said trunnion shaft so as to feedback the displacement of said second trunnion to said oil pressure drive device.

* * * * *